US008928672B2

(12) United States Patent
Corazza et al.

(10) Patent No.: US 8,928,672 B2
(45) Date of Patent: Jan. 6, 2015

(54) REAL-TIME AUTOMATIC CONCATENATION OF 3D ANIMATION SEQUENCES

(75) Inventors: Stefano Corazza, San Francisco, CA (US); Emiliano Gambaretto, San Francisco, CA (US)

(73) Assignee: Mixamo, Inc., San Francisco, CA (US)

( * ) Notice: Subject to any disclaimer, the term of this patent is extended or adjusted under 35 U.S.C. 154(b) by 676 days.

(21) Appl. No.: 13/097,031

(22) Filed: Apr. 28, 2011

(65) Prior Publication Data

US 2012/0038628 A1 Feb. 16, 2012

Related U.S. Application Data

(60) Provisional application No. 61/328,934, filed on Apr. 28, 2010.

(51) Int. Cl.
*G06T 13/00* (2011.01)
*G06T 13/40* (2011.01)
(52) U.S. Cl.
CPC ........................... *G06T 13/40* (2013.01)
USPC ............................. 345/473; 345/418; 345/474
(58) Field of Classification Search
None
See application file for complete search history.

(56) References Cited

U.S. PATENT DOCUMENTS

| 6,047,078 | A | 4/2000 | Kang |
| 6,088,042 | A | 7/2000 | Handelman et al. |
| 6,278,466 | B1 | 8/2001 | Chen |
| 6,552,729 | B1 | 4/2003 | Di Bernardo et al. |
| 6,554,706 | B2 | 4/2003 | Kim et al. |
| 6,700,586 | B1 | 3/2004 | Demers |
| 6,714,200 | B1 * | 3/2004 | Talnykin et al. ............ 345/473 |
| 7,168,953 | B1 | 1/2007 | Poggio et al. |
| 7,209,139 | B1 | 4/2007 | Keet et al. |
| 7,522,165 | B2 | 4/2009 | Weaver |

(Continued)

FOREIGN PATENT DOCUMENTS

| EP | 1884896 A2 | 2/2008 |
| WO | 2007132451 A2 | 11/2007 |

(Continued)

OTHER PUBLICATIONS

International Search Report for International Application No. PCT/US 09/57155, date completed Dec. 22, 2009, date mailed Jan. 12, 2010, 5 pgs.

(Continued)

*Primary Examiner* — Said Broome
(74) *Attorney, Agent, or Firm* — KPPB LLP (57) ABSTRACT

Systems and methods for generating and concatenating 3D character animations are described including systems in which recommendations are made by the animation system concerning motions that smoothly transition when concatenated. One embodiment includes a server system connected to a communication network and configured to communicate with a user device that is also connected to the communication network. In addition, the server system is configured to generate a user interface that is accessible via the communication network, the server system is configured to receive high level descriptions of desired sequences of motion via the user interface, the server system is configured to generate synthetic motion data based on the high level descriptions and to concatenate the synthetic motion data, the server system is configured to stream the concatenated synthetic motion data to a rendering engine on the user device, and the user device is configured to render a 3D character animated using the streamed synthetic motion data.

29 Claims, 9 Drawing Sheets

(56) References Cited

U.S. PATENT DOCUMENTS

| | | |
|---|---|---|
| 7,937,253 B2 | 5/2011 | Anast et al. |
| 8,749,556 B2 | 6/2014 | De Aguiar et al. |
| 8,797,328 B2 | 8/2014 | Corazza et al. |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0227752 A1 | 11/2004 | McCartha et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0134585 A1 | 6/2006 | Adamo-villani et al. |
| 2006/0171590 A1 | 8/2006 | Lu et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0182736 A1 | 8/2007 | Weaver |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0180448 A1 | 7/2008 | Anguelov et al. |
| 2008/0187246 A1 | 8/2008 | Andres Del Valle |
| 2008/0252596 A1 | 10/2008 | Bell et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0231347 A1 | 9/2009 | Omote |
| 2010/0020073 A1 | 1/2010 | Corazza et al. |
| 2010/0073361 A1 | 3/2010 | Taylor et al. |
| 2010/0134490 A1 | 6/2010 | Corazza et al. |
| 2010/0149179 A1 | 6/2010 | Aguiar et al. |
| 2010/0238182 A1 | 9/2010 | Geisner et al. |
| 2010/0253703 A1 | 10/2010 | Ostermann |
| 2010/0259547 A1 | 10/2010 | De Aguiar et al. |
| 2010/0278405 A1 | 11/2010 | Kakadiaris et al. |
| 2010/0285877 A1 | 11/2010 | Corazza |
| 2011/0292034 A1 | 12/2011 | Corazza et al. |
| 2012/0019517 A1 | 1/2012 | Corazza et al. |
| 2013/0021348 A1 | 1/2013 | Corazza et al. |
| 2013/0127853 A1 | 5/2013 | Corazza et al. |
| 2013/0215113 A1 | 8/2013 | Corazza et al. |
| 2013/0235045 A1 | 9/2013 | Corazza et al. |
| 2014/0160116 A1 | 6/2014 | De Aguiar et al. |
| 2014/0204084 A1 | 7/2014 | Corazza et al. |

FOREIGN PATENT DOCUMENTS

| | | |
|---|---|---|
| WO | 2009007701 A1 | 1/2009 |
| WO | 20100060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |

OTHER PUBLICATIONS

International Search Report for International Application No. PCT/US 09/65825, date completed Jan. 21, 2010, date mailed Jan. 28, 2010, 3 pgs.

International Search Report for International Application PCT/US2011/045060, completed Nov. 27, 2011, 2 pgs.

International Search Report for PCT/US2010/033797, filed May 5, 2010, report completed Jun. 11, 2010, 2 pgs.

Written Opinion of the international Searching Authority for International Application No. PCT/US 09/57155, date completed Dec. 22, 2009, date mailed Jan. 12, 2010, 6 pgs.

Written Opinion of the International Searching Authority for International Application No. PCT/US 09/65825, date completed Jan. 21, 2010, date mailed Jan. 28, 2010, 6 pgs.

Written Opinion of the International Searching Authority for International Application No. PCT/US2010/033797, filed May 5, 2010, completed Jun. 11, 2010, 4 pgs.

Written Opinion of the International Searching Authority for International Application No. PCT/US2011/045060, completed Nov. 27, 2011, 5 pgs.

Agular, E. DE et al., "Automatic Conversion of Mesh Animations into Skeleton-based Animations", Eurographics 2008, vol. 27, No. 2, Apr. 2008.

Anguelov et al., "Recovering Articulated Object Models from 3D Range Data", In Proceedings of the 20th Conference on Uncertainty in Artificial Intelligence, UAI 2004, 18-26.

Anguelov et al., "SCAPE: Shape Completion and Animation of People", Proceedings of the SIGGGRAPH Conference, 2005.

Anguelov et al., "The Correlated Correspondence Algorithm for Unsupervised Registration of Nonrigid Surfaces", Advance in Neural Information Processing Systems, 17, pp. 33-40, 2005.

Baran et al., "Automatic rigging and animation of 3D characters", ACM Transactions on Graphics (TOG)—Proceedings of ACM SIGGRAPH 2007, vol. 26 Issue 3, Jul. 2007.

Beaudoin, et al., "Adapting Wavelet Compression to Human Motion Capture Clips", GI '07 Proceedings of Graphics Interface, 2007, 6 pages.

Blanz et al., "A Morphable Model For The Synthesis of 3D Faces", In Proceedings of ACM SIGGRAPH 11999, 8 pgs, 1999.

Bray, Joseph, "Markerless Based Human Motion Capture: A Survey", Published 2001, 44 pgs.

Buenaposada et al., Performance Driven Facial Animation Using Illumination Independent Appearance-Based Tracking, In Proceedings of ICPR, Hong Kong, Aug. 2006, 4 pgs.

Cheung et al., "Shape-from Silhouette of Articulated Objects and its use for Human Body Kinematics Estimation and Motion Capture", In Conference on Computer Vision and Pattern Recognition (CVPR), pp. 77-84, 2003.

Curio et al., "Semantic 3D Motion Retargeting for Facial Animation", ACM 2006, 8 pgs.

Curless at al., Allen, "The Space of Human Body Shapes: Reconstruction and Parameterization from Range Scans", ACM Transactions on Graphics, 22(3), pp. 587-594, 2003.

Curless et al., "A Volumetric Method of Building Complex Models from Range Images". Retrieved from http://graphics.stanford.edu/papers/volrange/volrange.pdf, pp, 1-10, 1996.

Curless et al., Allen, "Articulated Body Deformation from Range Scan Data", ACM Transactions on Graphics, 21(3), 612-619, 2002.

Davis et al., "Filing Holes in Complex Surfaces Using Volumetric Diffusion", Proc. First Symposium on 3D Data Processing, Visualization, and Transmission, 2002, pp. 1-11.

De Aguiar, et al., "Marker-Less 3D Feature Tracking for Mesh-Based Human Motion Caption", Human Motion 2007, LNCS 4818, 2007, 1-15.

Di Bernardo et al., "Generating Realistic Human Motions from Observations", submitted to Fifth European Conf. on Computer Vision, ECCV 1998, pp. 1-12.

Gao, et al., "Motion normalization: the Preprocess of Motion Data", 2005, pp. 253-256.

Garland et al., "Surface Simplification Using Quadric Error Metrics", Proceedings of SIGGRAPH 1997, pp. 209-216, 1997.

Goncalves et al., Reach Out and Touch Space (Motion Learning), Automatic Face and Gesture Recognition, 1998. Proceedings. Third IEEE international Conference on Apr. 14-16, 1998, pp. 234-239.

Hahnel et al., "An Extension of the ICP Algorithm for Modeling Nonrigid Objects with Mobile Robots", Proceedings of the International Joint Conference on Artificial Intelligence (IJCAI), 2003, 6pgs.

Hilton et al., "From 3D Shape Capture to Animated Models", First International Symposium on 3D Processing, Visualization and Transmission (3DVPT2002).

(56) References Cited

OTHER PUBLICATIONS

Ju, et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pages.

Kahler et al., "Head Shop: Generating Animated Head Models with Anatomical Structure", ACM SIGGRAPH Symposium on Computer Animation, pp. 55-64, 2002.

Lewis, "H.264/MPEG-4 AVC CABAC overview", http://www.theonlineoasis.co.uk/notes.html, Dec. 3, 2012.

Lewis et al., "Pose Space Deformation: A Unified Approach to Shape Interpolation and Skeleton-Drive Deformation", Proceedings of ACM SIGGRAPH 2000, pp. 165-172, 2000.

Liepa, P., "Filing Holes in Meshes", Proc. of the Eurographics/ACM SIGGRAPH Symposium on Geometry Processing, pp. 200-205, 2003.

Ma et al., "An invitation to 3D Vision", Springer Verlag, pp. 15-28, 2004.

Mamou et al., "Temporal OCT-based compression of 3D dynamic meshes", ICCOM'06 Proceedings of the 10th WSEAS international conference on Communications, Jul. 10-12, 2006, 74-79.

Mamou et al., "The New MPEG-4/FAMC Standard for Animated 3D Mesh Compression", IEEE 3DTV-CON'08, May 2008.

Max Planck Institut Informatik, "Automatic Conversion of Mesh Animations into Skeleton-based Animations", http://www.mplinf.mpg.de/-edeaguia/animation_eg08.html, Mar. 30, 2008, 9pgs.

Mohr et al., "Building Efficient, Accurate Character Skins froms Examples", ACM Transactions on Graphics, 22(3), 582-568, 2003.

Noh et al., "Expression Cloning", Proceedings of ACM SIGGRAPH 2001, pp. 277-288, 2001.

Okada, R et al., "A Video Motion Capture System for Interactive Games.", MVA2007 IAPR Conference on Machine Vision Applications, Tokyo, Japan, May 16-18, 2007, 4 pgs.

Park et al., "On-line locomotion generation based on motion blending", ACM SIGGRAPH Symposium on Computer Animation. San Antonio, Jul. 21, 2002, 8 pages.

Park et al., "On-line motion blending for real-time locomotion generation", Computer Animation & Virtual Worlds. Wiley, UK, vol. 15, No. 3-4, Jul. 2004, 14 pages.

Popovic et al., "Style-Based Inverse Kinematics", ACM Transactions on Graphics, 23(3), 522-531, 2004.

Safonova et al., "Construction and optimal search of interpolated motion graphs", ACM SIGGRAPH, 2007, 11 pages.

Sand et al., "Continuous Capture of Skin Deformation", ACM Transactions on Graphics, 22(3), pp. 578-586, 2003.

Scholkopt et al., "A Tutorial on support Vector Regression", In Technical Report NC2-TR-1998-030, NeuroCOLT2, 1998.

Seo et al., "An Automatic Modeling of Human Bodies from Sizing Parameters.", In Symposium on Interactive 3D Graphics, 19-26, 2003.

Sloan et al., "Shape By Example", In 2001 Symposium on Interactive 3D Graphics, pp. 135-144, 2001.

Smola et al., "A Tutorial on Support Vector Regression". Statistics and Computing London 14(3) pp. 199-222, 2004.

Sumner et al., "Deformation Transfer for Triangle Meshes", Proceedings of ACM SIGGRAPH 2004, 23(3), pp. 399-405, 2004.

Szliski et al., "Matching 3D Anatomical Surfaces with Non-rigid Deformations Using Octree-splines", International Journal of Computer Vision, 1996, 18,2, pp. 171-186.

Tao, Ju et al., "Mean Value Coordinates for Closed Triangular Meshes", Proceedings of ACM SIGGRAPH (2005), 6 pgs.

Taylor et al., "Modeling Human Motion Using Binary Latent Variables", Proc. of Advances in Neural Information Processing Systems (NIPS) 19, 8 pgs, 2006.

Tung et al., "Topology Matching for 3D Video Compression Computer Vision and Pattern Recognition", IEEE Conference Computer Vision and Pattern Recognition, 2007, Jun. 2007, 8 pgs.

Vasilescu et al., "Multilinear Analysis of Image Ensembles: Tensorfaces", European Conference on Computer Vision (ECCV), pp. 447-460, 2002.

Vlasic et al., "Face Transfer with Multilinear Models", ACM Transactions on Graphics 24(3), pp. 426-433, 2005.

Vlasic et al., "Multilinear Models for Facial Synthesis", SIGGRAPH Research Sketch, 2004.

Von Luxburg, "A Tutorial on Spectral Clustering, Statistics and Computing", 2007, 32 pgs.

Wang et al., "Multi-weight Enveloping: Least Squares Approximation Techniques for Skin Animation", ACM SIGGRAPH Symposium on Computer Animation, pp. 129-138, 2002.

Zhidong et al., "Control of motion in character animation", Jul. 14. 2004, 841-848.

Blanz, Volker et al., "Reanimating Faces in Images and Video", Computer Graphics Forum, vol. 22, No. 3, Biackwell Publishing, Inc., 2003, 10 pgs.

Seitz, Steven M. et al., "A Comparison and Evaluation of Multi-View Stereo Reconstruction Algorithms", Computer Vision and Pattern Recognition, 2006 IEEE Computer Society Conference on. vol. 1. IEEE, 2006., 2006, 8 pgs.

\* cited by examiner

REAL-TIME AUTOMATIC CONCATENATION OF 3D ANIMATION SEQUENCES

CROSS-REFERENCE TO RELATED APPLICATIONS

The current application claims priority to U.S. Provisional Application No. 61/328,934, filed Apr. 28, 2010, the disclosure of which is incorporated herein by reference in its entirety.

FIELD OF THE INVENTION

The present invention relates generally to the generation of animation and more specifically to the concatenation of animations.

BACKGROUND OF THE INVENTION

Three dimensional (3D) character animation has seen significant growth in terms of use and diffusion in the entertainment industry in the last decade. In most 3D computer animation systems, an animator defines a set of animation variables, or Avars that form a simplified representation of a 3D character's anatomy. The Avars are often organized in a hierarchical model and, therefore, the collection of Avars for a 3D character can be referred to as its hierarchical model. Motion of the 3D character can be defined by changing the values of Avars over time. The value of an Avar over time is referred to as the Avar's motion curve, and a sequence of motion can involve defining the motion curves for hundreds of Avars. The motion curves of all of a 3D character's Avars during a sequence of motion are collectively referred to as motion data.

An animator can directly animate a 3D character by manually defining the motion curves for the 3D character's Avars using an off-line software tool. Motion capture of a human or animal during a desired sequence of motion can also be used to generate motion data. Motion capture is a term used to describe a process of recording movement and translating the movement onto a digital model. A 3D character can be animated using the motion capture process to record the movement of points on the human or animal that correspond to the Avars of the 3D character during the motion. Motion capture has traditionally been performed by applying markers to the human or animal that can be mapped or retargeted to the Avars of the 3D character. However, markerless techniques have recently been developed that enable the animation of 3D characters using mesh based techniques. Markerless motion capture using mesh based techniques is described in U.S. Patent Publication No. 2008/0031512 entitled "Markerless Motion Capture System" to Mundermann, Corazza and Andriacchi, the disclosure of which is incorporated by reference herein in its entirety.

Animating a 3D character manually or using motion capture can be time consuming and cumbersome. As discussed above, the manual definition of a character's motion can involve a laborious process of defining and modifying hundreds of motion curves until a desired motion sequence is obtained. Motion capture requires the use of complex equipment and actors. In the event that the captured motion is not exactly as desired, the animator is faced with the choice of repeating the motion capture process, which increases cost, or attempting to manually edit the motion curves until the desired motion is obtained, which is difficult. The inability of animators to rapidly and inexpensively obtain complex motion data for a 3D character can represent a bottleneck for the generation of 3D animations.

Furthermore, transitions between animations are difficult given that the Avars at the end of one motion may not correspond to the Avars at the start of the next motion. For example, simply concatenating the motion data of sitting down and that of running would yield a choppy transition where a character first ends in a sitting position and next begins in an erect running position. Realistic animation involves smooth transitions from the end of one motion into the start of the next motion. The inability of animators to rapidly and inexpensively concatenate motion data for a 3D character can represent another bottleneck for the generation of 3D animations.

SUMMARY OF THE INVENTION

Systems and methods for generating and concatenating 3D character animations are described including systems in which recommendations are made by the animation system concerning motions that smoothly transition when concatenated. One embodiment includes a server system connected to a communication network and configured to communicate with a user device that is also connected to the communication network. In addition, the server system is configured to generate a user interface that is accessible via the communication network, the server system is configured to receive high level descriptions of desired sequences of motion via the user interface, the server system is configured to generate synthetic motion data based on the high level descriptions and to concatenate the synthetic motion data, the server system is configured to stream the concatenated synthetic motion data to a rendering engine on the user device, and the user device is configured to render a 3D character animated using the streamed synthetic motion data.

In a further embodiment, the server system includes an application server and a web server that are configured to communicate, the application server is configured to communicate with a database of motion data, the web server is connected to the communication network, the application server is configured to generate the at least one motion model using the motion data and provide the at least one motion model to the web server, the web server is configured to generate the user interface that is accessible via the communication network, the web server is configured to receive the high level descriptions of the desired sequences of motion via the user interface, the web server is configured to use the at least one motion model to generate synthetic motion data based on the high level descriptions of the desired sequence of motion, and the web server is configured to stream the synthetic motion data to a rendering engine on the user device.

In another embodiment, the server system is configured to concatenate two sets of motion data by determining the optimal parameters for the transition between the sets of motion data using a similarity map.

In a still further embodiment, the server system is configured to score the similarity between concatenated motion data.

In still another embodiment, the server system is configured to refine a transition between concatenated motion data based upon the similarity score of the concatenated motion data.

In a yet further embodiment, the server system is configured to refine the transition between the concatenated motion data by inserting an intermediate motion data sequence between the concatenated motion data.

In yet another embodiment, the high level description of the desired sequence of motion includes at least a motion type, and at least one performance attribute.

In a further embodiment again, the performance attribute is a description of a physical characteristic or an expressive characteristic of the motion.

In another embodiment again, the motion type is expressed as one of a number of discrete types of motion.

In a further additional embodiment, the high level description of the desired sequence of motion includes a trajectory of the motion, which is specified using at least a start point and an end point.

In another additional embodiment, the performance attribute is expressed using at least one value from a continuous scale that corresponds to a high level characteristic that was used to describe differences between repeated sequences of motion in the motion data used to generate the motion models.

In another further embodiment, the high level description of the desired sequence of motion further describes a procedural attribute that is applied to all concatenated motions.

In a still yet further embodiment, the synthetic motion data is based upon a standard model for a 3D character, the server system is configured to receive a model of a 3D character from the user device via the communication network, the server system is configured to retarget the synthetic motion data to the received model of a 3D character, and the synthetic motion data streamed by the server system is the retargeted synthetic motion data.

Still yet another embodiment also includes a database including similarity scores for specific combinations of motion data, the server system is configured to receive a high level description of a sequences of motion via the user interface, the server system is configured to query the database based upon the high level description of a sequence of motion to obtain at least one similar motion, and the server system is configured to generate a user interface listing the at least one similar motion.

In a still further embodiment again, the server system is configured to receive a second high level description of a sequence of motion selected based upon the list of at least one similar motion.

An embodiment of the method of the invention includes receiving a plurality of high level descriptions of motion characteristics for a plurality of desired motion sequences from a user device via a user interface generated by a server system, generating synthetic motion data using the server system based upon the high level descriptions of the motion characteristics for a desired motion sequence, concatenating the synthetic motion data, streaming the concatenated motion data from the server system to the user device, and rendering an animation of a 3D character using the client device based upon the streamed synthetic motion data.

A further embodiment of the method of the invention further includes obtaining a custom model of a 3D character, and retargeting the concatenated motion data to the custom model prior to streaming the synthetic motion data to the user device.

In another embodiment of the method of the invention the custom model of a 3D character is uploaded to the server system from the user device.

In a still further embodiment of the method of the invention, the custom model of a 3D character is generated by the server system in response to a high level description of the 3D character obtained from the user device via a user interface generated by the server system.

A yet further embodiment of the method of the invention also includes scoring the similarity between concatenated motion data.

Yet another embodiment of the method of the invention also includes refining a transition between concatenated motion data based upon the similarity score of the concatenated motion data.

In a further embodiment again of the method of the invention, refining the transition between the concatenated motion data includes inserting an intermediate motion data sequence between the concatenated motion data.

In another embodiment again of the method of the invention, the high level description of motion characteristics includes at least a motion type, a trajectory for the motion, and at least one performance attribute.

In a further additional embodiment of the method of the invention, the performance attribute is a description of a physical characteristic or an expressive characteristic of the motion.

In another additional embodiment of the method of the invention, the motion type is expressed as one of a number of discrete types of motion.

In a still yet further embodiment of the method of the invention, the trajectory of the motion is specified including at least a start point and an end point.

In still yet another embodiment of the method of the invention, the performance attribute is expressed using at least one value from a continuous scale that corresponds to a high level characteristic that was used to describe differences between repeated sequences of motion in the motion data used to generate the motion models.

In a still further embodiment again of the method of the invention, the synthetic motion data is based upon a standard model for a 3D character and further including receiving a model of a 3D character from the user device via the communication network, retargeting the synthetic motion data to the received model of a 3D character, and streaming the retargeted synthetic motion data.

In still another embodiment again of the method of the invention, receiving a plurality of high level descriptions of motion characteristics for a plurality of desired motion sequences from a user device via a user interface generated by a server system further includes receiving a high level description of motion characteristics via the user interface, querying a database including similarity scores for specific combinations of motion data based upon the high level descriptions of motion characteristics to obtain at least one similar motion, generating a user interface listing the at least one similar motion, and receiving a second high level description of motion characteristics selected based upon the list of at least one similar motion.

DETAILED DESCRIPTION

Turning now to the drawings, systems and methods for generating and concatenating 3D character animations are illustrated. In many embodiments, an animation system concatenates motion data from several motions to create an animation sequence. In the context of concatenating motion data, the term motion can be used to describe a set of motion data that corresponds to a specific type of movement (e.g. walking, running, jumping, etc.). Motion data, which can be synthetic or actual, are values that can be applied to the Avars of a 3D character skeleton to animate the 3D character. In certain embodiments, combination processes are used to blend the motion data of several motions to create a smooth motion sequence. In many embodiments, animations are concatenated by determining an optimally defined pivot around which the motion data of two motions is blended, such as (but not limited to) a character pivoting on a specific foot or points in the motions where the hips are similarly located. In a number of embodiments, a new intermediate sequence or frame is generated when concatenating dissimilar motions so as to improve the smoothness of the transition between the motions. More than one intermediate sequence or frame can be used to concatenate motion data. Multiple embodiments allow for user control of aspects of concatenation, such as fine tuning of the animation.

In several embodiments, the animation system is configured to provide recommendations for motions that transition well when combined with already selected motions. Various embodiments are configured to rate animations generated using concatenated motion data. In many embodiments, a database of recommended motion combinations can be accessed to populate a list of recommended motions that can be concatenated with previously selected motions as part of a user interface.

In many embodiments, an animation system distributes processing between a user's computer and one or more remote servers. The user can select among animations and motion data provided by a server and give a high level description of the animation concatenation. Providing a high level description can allow for generating synthetic motion data corresponding to a desired concatenated motion sequence without directly editing the motion data. In several embodiments, the server is configured to generate synthetic motion data based upon the high level description of the desired concatenation sequence provided by the user using one of a number of motion models that the server can retarget to a 3D character. The motion data for the concatenated animation can then be streamed to software resident on the user's computer, which can render an animation of the 3D character using the motion data. In this way, a single set of motion models, concatenation and retargeting software can be shared amongst different users without the servers bearing the processing burden of rendering each 3D animation concatenation using the generated synthetic motion data. The processing burden of rendering the animations is instead borne by the user's computers.

Animation System

Figure 1:
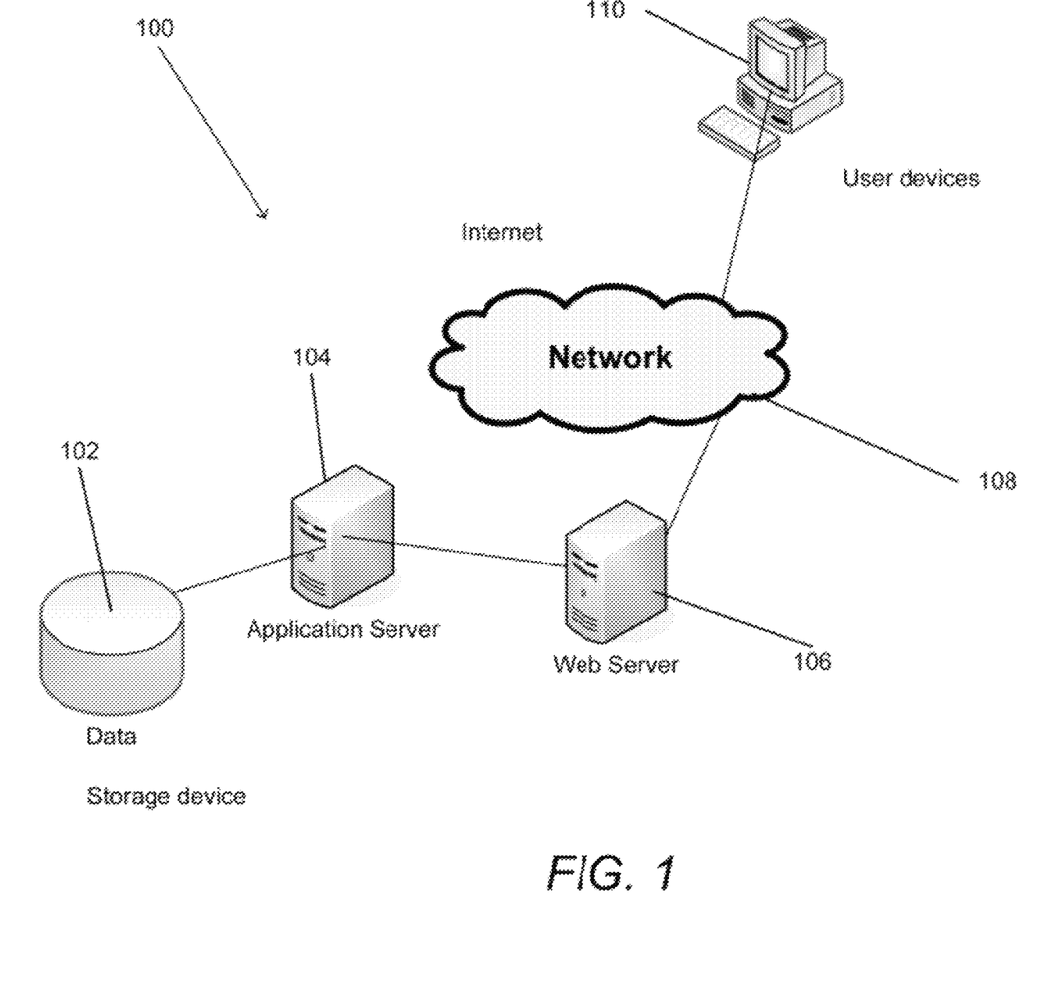
FIG. 1 is a semi-schematic diagram of an animation system configured to generate and concatenate motion data in accordance with an embodiment of the invention.

A semi-schematic diagram of an animation system configured to generate and concatenate motion data in accordance with an embodiment of the invention is shown in FIG. 1. The animation system 100 includes a storage device 102 connected to a server system, which in the illustrated embodiment includes an application server 104 connected to a web server 106. The web server is connected to a network, 108 such as the Internet and a number of user devices 110 can access the web server via a network such as the Internet using a browser application.

In many embodiments, the storage device 102 contains motion data that is used by the application server 104 to create one or more motion models. A motion model is a model that can generate synthetic motion data corresponding to a high level description of desired motion characteristics. The application server 104 deploys the motion model to the web server 106, which can use the motion model to create and concatenate synthetic motion data based upon a high level description. The term synthetic motion data describes motion data that is generated by a machine. Generation of synthetic motion data is described in U.S. patent application Ser. No. 12/753,032, to de Aguiar et al. entitled "Web Platform for Interactive Design, synthesis and Deliver of 3D Character Motion data", filed Apr. 1, 2010, the disclosure of which is incorporated by reference herein in its entirety. The web server 106 can create a web based user interface that can be accessed via a user device 110 configured with an appropriate browser application. Users can use the web based user interface to concatenate motions based upon a high level description of desired motion combinations.

In several embodiments, the web based user interface enables an animator to provide a high level description of a desired sequence of motions. The web server 106 uses the high level description to generate and concatenate synthetic motion data in real time, which then can be retargeted and used to animate a specific 3D character. The 3D character can be resident on the server, generated by the server from a high level description in accordance with the process described in U.S. patent application Ser. No. 12/625,553 to Corazza et al. entitled "Real Time Generation of Animation-Ready 3D Character Models" filed Nov. 24, 2009, the disclosure of which is incorporated by reference herein in its entirety, or uploaded to the server from the user's computer. The concatenation of the selected motion data is discussed further below.

Concatenation of Motion Data

Figure 2:
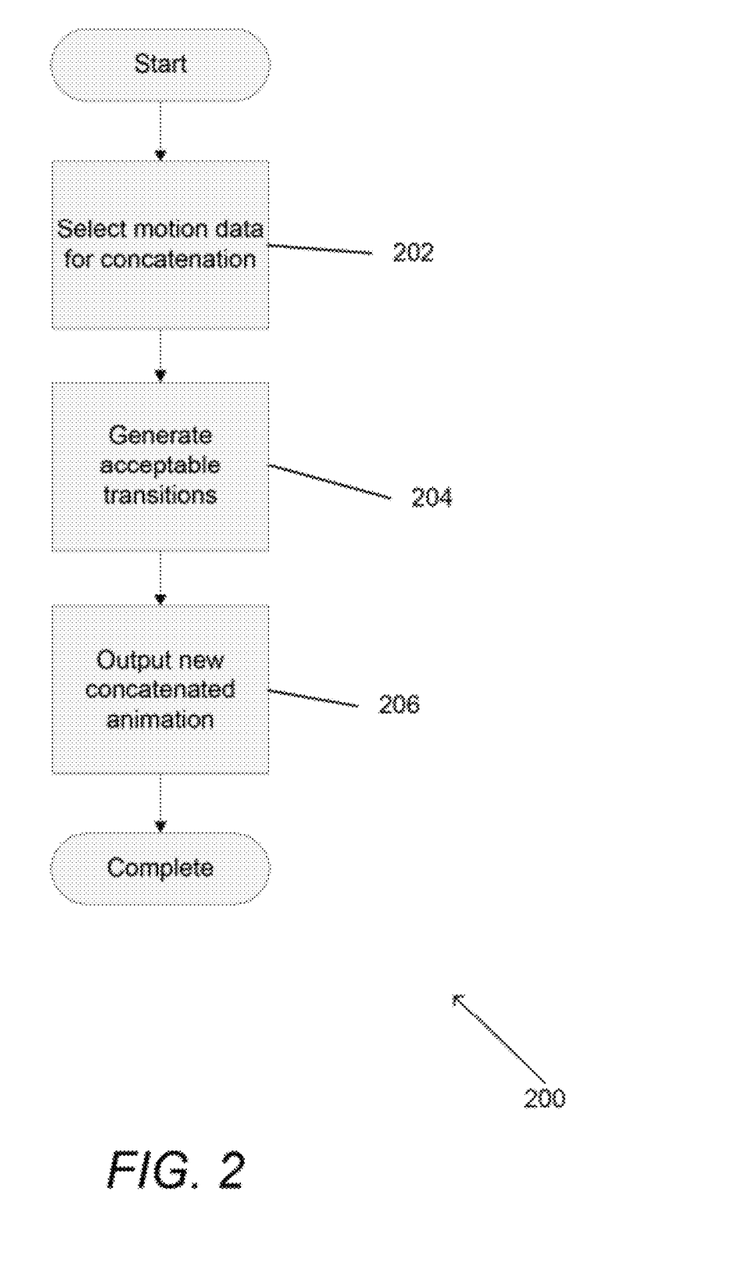
FIG. 2 is a flow chart illustrating a process for concatenating animations in accordance with an embodiment of the invention.

FIG. 2 is a flow chart illustrating a process for concatenating animations in accordance with an embodiment of the invention. The process 200 begins with selecting (202) motion data for concatenation. After selecting (202) the motion data for concatenation, acceptable transitions between the motions are generated (204) by modifying and/or adding additional motion data to the concatenated motion data. After an acceptable transition is generated (204), the concatenated motion data can be utilized to animate (206) a 3D character.

In a number of embodiments, a user selects specific motions to combine via a user interface. In many embodiments, the motion data for the selected motions is then generated or obtained and then concatenated. The transition between the two sets of motion data can be refined until an acceptable transition is obtained and the motion data used to animate a 3D character. Processes for concatenating motion data and improving the transition between different sets of concatenated motion data in accordance with embodiments of the invention are discussed further below.

Improving Transitions

Figure 3:
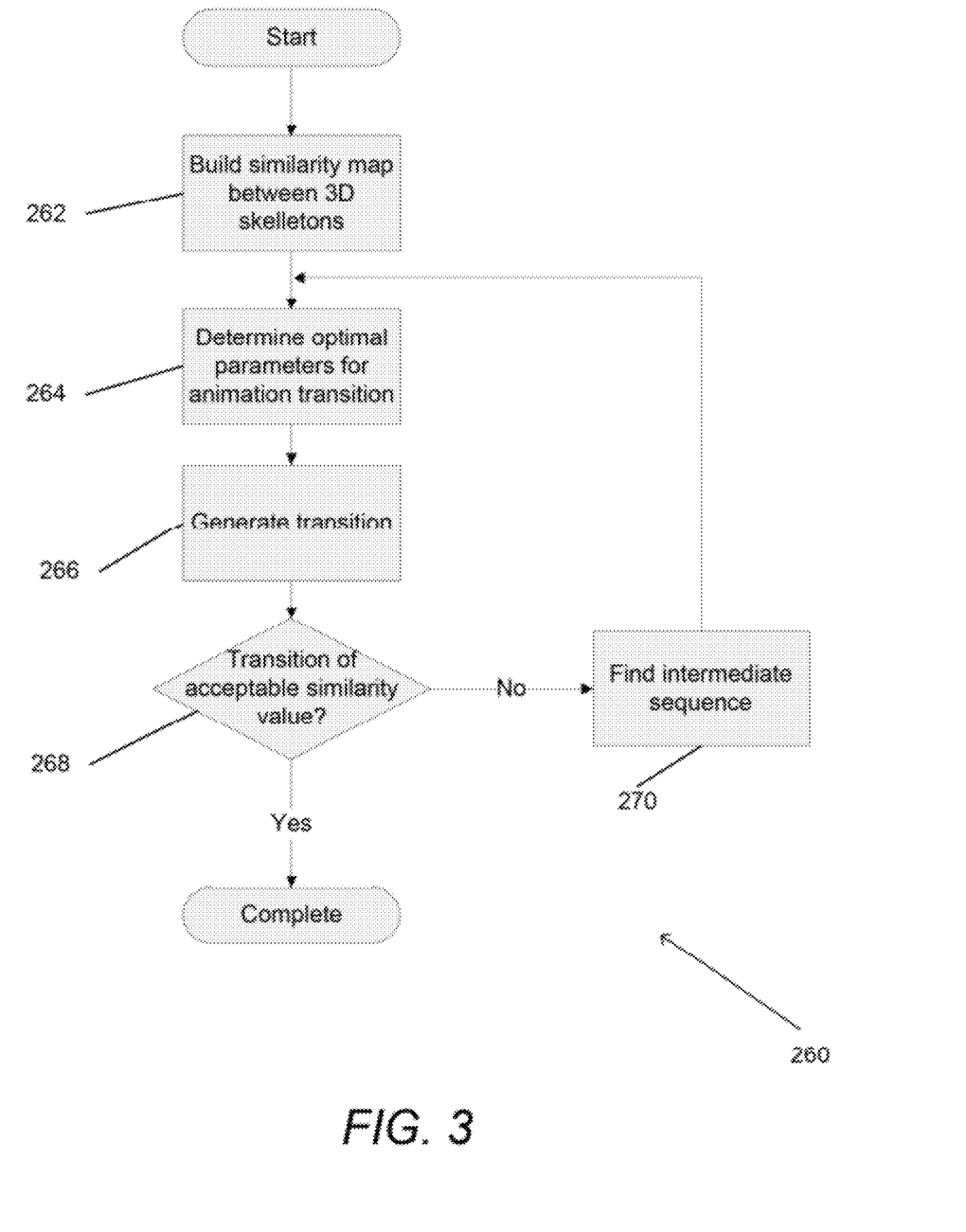
FIG. 3 is a flow chart illustrating a process for generating transitions between concatenated motions in accordance with an embodiment of the invention.

FIG. 3 is a flow chart illustrating a detailed process 260 for concatenating sequences of motion data in accordance with an embodiment of the invention. First a similarity map between the sequences of motion data is built (262). After budding (262) the similarity map, optimal parameters for the transition between the sequences of motion data are determined (264), and a transition between the motion data is generated (266). A decision (268) is then made as to whether the transition is of acceptable similarity value. If the transition is not of acceptable similarity value, an intermediate sequence is found (270) and the process loops back to determine (264) optimal parameters for the transition between the intermediate sequence to the sequences of motion data being concatenated. When a transition of acceptable similarity value is obtained, the process ends.

In many embodiments, the similarity map built using a process similar to the process outlined above takes into account the pose of the character skeleton in 3D space in the two motions. A 2D registration of the poses of the skeleton at the end of the first motion and the pose of the skeleton at the start of the second motion is performed by sampling each pose on the floor plane in order to make the similarity map independent of character position and orientation. This then provides a determination of the optimal parameters for the transition between the sets of motion data. In several embodiments, the similarity map is weighted so that higher similarity scores are assigned to transitions, when key components of the character skeleton exhibit similarity. For example, the similarity map can give additional weight to key components of a character skeleton including (but not limited to) pivot points or joints in an ankle of the 3D character, the hips of the 3D character and/or the center of mass of a 3D character.

The similarity map can be utilized to generate a transition using combination processes including but not limited to a combination of motion blending; linear or non-linear time warping; physics considerations such as conservation of momentum or speed; pose matching elements such as matching of the pivot node position and or orientation; and IK constraints. Generating a transition can start with the spatial registration and time-warping of the first and additional motions according to optimally defined parameters obtained in the manner outlined above, such as using a foot or the hips as a pivot. Then the optimal blending between the frames of the first motion and frames of the additional motion can be computed. Further corrections and/or improvements can be applied to the blended motion, including but not limited to time-warping correction, smoothness enforcement, and corrections accounting for conservation of momentum or speed. A number of controls can be open to user's interaction for fine tuning of the motions for 3D character animation.

In numerous embodiments, high quality transitions are defined as transitions with an acceptable similarity value. An automatic method can be implemented to rate the quality of transitions obtained without direct user input based upon the similarity value of the transition. If a transition has a similarity score exceeding a predetermined threshold, then the transition is determined to be acceptable. If the transition fads to meet a predetermined level of quality and/or similarity, then a short sequence of one or more frames of motion can be used to serve as an intermediate sequence, or "bridge" between the two animations. In many embodiments, the process of generating transitions repeats until a "bridge" is obtained that achieves an appropriate level of similarity.

In many embodiments, the intermediate sequence is a new intermediate sequence of one or more frames that is found to produce a better quality transition. In one embodiment motion graphs are utilized to identify an appropriate bridge sequence from a database of short motion sequences. In another embodiment an extensive search for a "bridge" sequence is done over a database of motions. These motions can be described through metadata and a taxonomy tree to allow for real-time search. The database of motions can be a database of possible motion combinations. For example, to concatenate a "walking" motion with a "talking while seated" motion, the transition between the two motions can involve a "bridge" motion sequence in which the character skeleton transitions from a walking stance to a seated pose. This can be found in the database by searching for an intermediate sequence that has a good similarity with the selected motions. Similarity can be observed by analysis of the motion data of the "bridge" motion sequence or by reviewing metadata describing the types of motions that the "bridge" motion sequence is suited for bridging.

In many embodiments, the process of generating acceptable transitions is simplified by providing recommendations concerning combinations of motion data that produce acceptable transitions when concatenated. Systems and methods for recommending combinations of motion data that produce acceptable transitions when concatenated in accordance with embodiments of the invention are discussed below.

Motion Combination Database

In many embodiments, the process of concatenating sequences of motion data is simplified by creating a database of metadata concerning the similarity of different sets of motion data. In many systems, a motion model enables the generation of synthetic motion data for variations on a specific type of walking. For example, a motion model of walking can be utilized to generate a fast walk or a slow walk. In addition, the motion model could have the capability of varying stride length. Therefore, metadata concerning the similarity of specific sequences of motion data generated by motion models based upon specific high level descriptions can be useful in providing recommendations concerning motion models and/or high level descriptions of motion that can be used to generate a motion similar to a sequence of motion data that has already been generated. In a number of embodiments, metadata concerning the similarity of different sets of synthetic motion data that can be generated by a set of motion models is obtained by generating synthetic motion data using the motion models and automatically scoring the similarity of different concatenated sequences. The similarity scores can then be stored and used by an animation to recommend a set of motion data that will transition well from an existing set of motion data.

Figure 4:
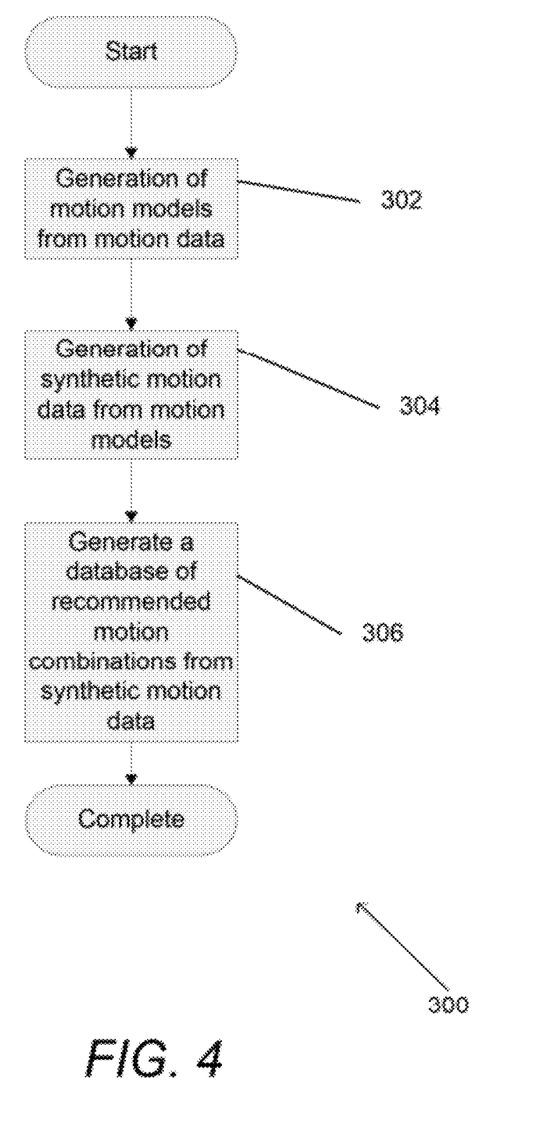
FIG. 4 is a flow chart illustrating a process for creating a database of motion combinations in accordance with an embodiment of the invention.

FIG. 4 is a flow chart illustrating a process for creating a database of motion combinations that can be utilized to build a database of motion concatenation scores and/or recommendations in accordance with an embodiment of the invention. The process 300 begins with generating (302) motion models from a training set of motion data. After motion models are generated (302), synthetic motion data can be created (304) using the motion models based upon various high level descriptions of desired motion. After creating synthetic motion data, a database of metadata concerning the similarity of the generated synthetic motion data sequences can be created (306) by concatenating the motion data and automatically evaluating the quality of the resulting transitions.

When a database of metadata concerning the similarity of synthetic motion data generated using specific high level motion descriptions is generated, recommendations are typically based upon automatic determinations of the smoothness and/or quality of the transition between the sets of concatenated motion data. For example, a set of motion data indicative of a running motion can be smoothly concatenated with a set of motion data indicative of walking. Processes for generating synthetic motion and scoring the similarity between sets of synthetic motion data for the purposes of populating a database of metadata concerning the similarity of synthetic motion data generated using specific combinations of motion models and/or high level motion descriptions in accordance with embodiments of the invention are discussed further below.

Generation of Motion Models from Motion Data

Figure 5:
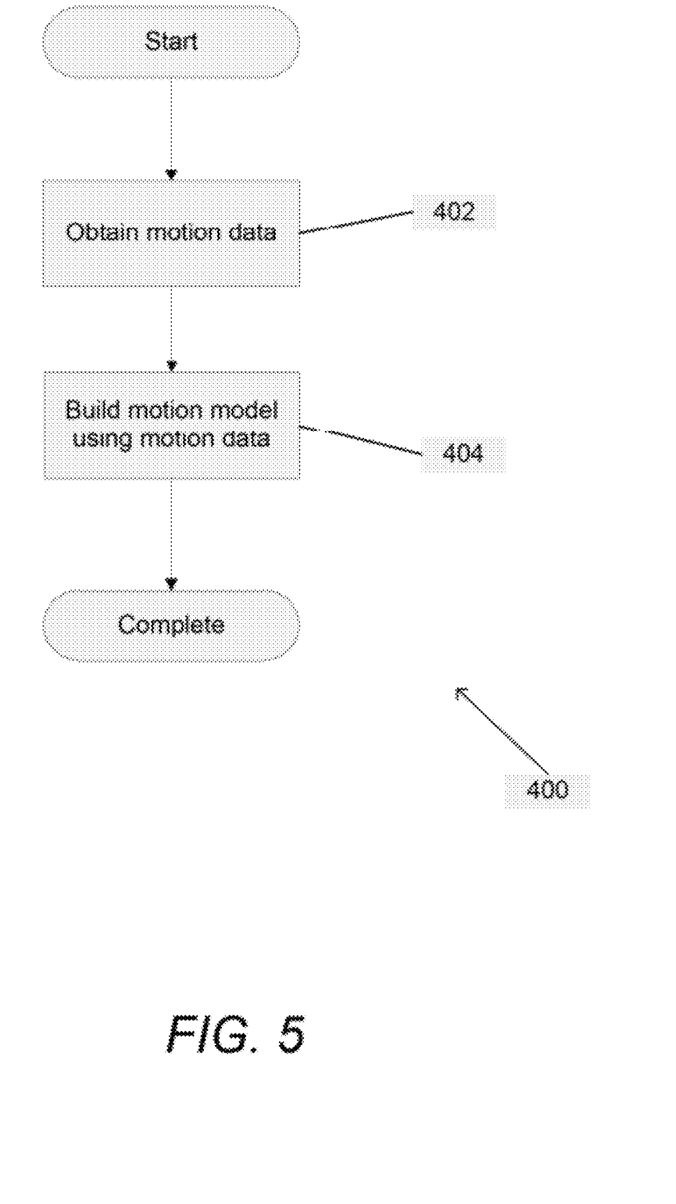
FIG. 5 is a flow chart illustrating a process for generating motion models from motion data in accordance with an embodiment of the invention.

FIG. 5 is a flow chart illustrating a process for generating motion models from motion data in accordance with an embodiment of the invention. The process 400 begins by obtaining (402) motion data. After obtaining (402) motion data, a motion model is built (404) using the motion data. Generation of motion models from motion data is described in U.S. patent application Ser. No. 12/753,032, to de Aguiar et al. entitled "Web Platform for Interactive Design, synthesis and Deliver of 3D Character Motion data", filed Apr. 1, 2010, the disclosure of which is incorporated by reference herein in its entirety.

The motion data used to build a motion model in accordance with an embodiment of the invention can be actual motion data obtained via motion capture (either marker based or markerless), or can be synthetic motion data created manually by an animator using a conventional off-line animation software application. For the motion data to be used in the training of the motion model, each sequence of motion data is described using a set of high level characteristics appropriate to the application. The motion data is then used to build (404) a motion model. As discussed above, any model appropriate to the application that is capable of generating synthetic motion data from a high level description of a desired motion sequence can be used. In a number of embodiments, the motion model uses a combination of interpolation and linear or non-linear time warping of motion capture data to generate synthetic motion data. In several embodiments, the motion model is a statistical model trained using supervised learning. After motion models are built, the motion models can be used to generate synthetic motion data. As noted above, synthetic motion data generated by the models can be concatenated and the high level descriptions used to generate the synthetic motion data can be rated to create a database of recommendations concerning the high level motion descriptions that will generate motion data that can be smoothly concatenated. Processes for scoring the similarity of concatenated sequences of motion data in accordance with embodiments of the invention are discussed further below.

Filtering for Acceptable Similarity Value

Figure 6:
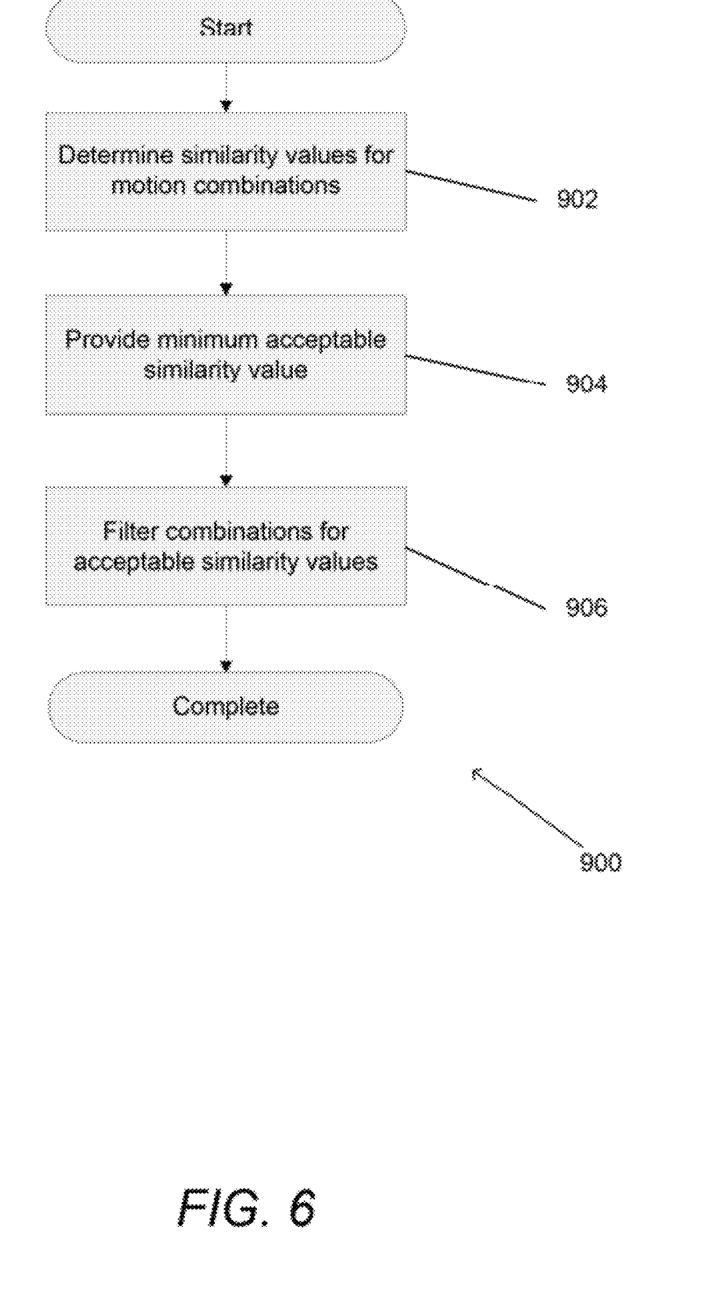
FIG. 6 is a flow chart illustrating an online process for filtering for acceptable motion combinations and assessing whether transitions have acceptable similarity value in accordance with an embodiment of the invention.

FIG. 6 is a flow chart illustrating a process 900 for generating acceptable motion combinations in accordance with an embodiment of the invention. The process 900 includes determining (902) the similarity values for a number of motion combinations. After determining (902) the similarity values, a determination (904) is made concerning whether the similarity value for a combination of two motions exceeds a predetermined threshold. In the event that the combination exceeds the predetermined threshold, the combination of motions can be recommended. In several embodiments, the recommendation is listed in a database or lookup table of recommended motion combinations. In other embodiments, the filtering processes is performed in real time and a recommendation is made with respect to a specific pair of selected motions.

In several embodiments, similarity values are obtained automatically. For example, similarity values can be a result of a parametric function. In other embodiments, similarity values can be manually assigned by animators. In still other embodiments, similarity values can be determined by a combination of automatic and manual processes. In many embodiments, the minimum acceptable similarity value can be selected by a user or be privy to other considerations. For example, the minimum acceptable similarity value can differ depending on the types of motions that are being combined.

Similarity Value Determination

The ability to characterize the similarity of concatenated motions can be useful in providing an animator with feedback concerning a specific transition and/or with recommendations concerning suitable motions for combination with a selected motion. A variety of processes can be used to score the similarity of concatenated motion data. In many embodiments, a training set of motion data is concatenated and animators score the quality of the transitions. The scored training data set can then be used to learn the attributes of a high quality transition and build an automated process for scoring the transitions.

Figure 7:
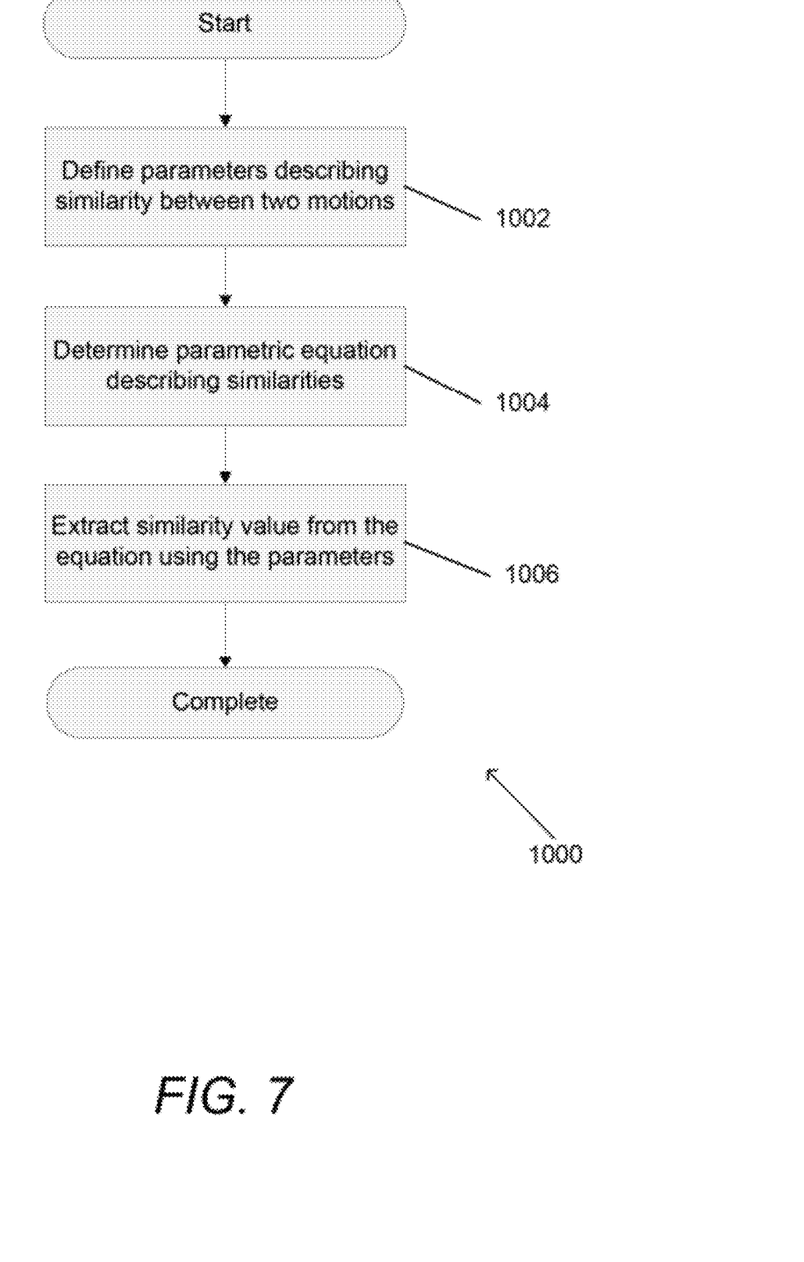
FIG. 7 is a flow chart illustrating an automatic process for determining the similarity value between two motions in accordance with an embodiment of the invention.

FIG. 7 is a flow chart illustrating a process for determining a parametric equation that can be used to score the similarity of concatenated motion data. A set of parameters is defined (1002) that are relevant to describing the similarity between two sets of motion data and the relevant parameters used to determine (1004) a parametric equation describing the similarities between the two motions. The constants of the parametric equation can be optimized based upon scores assigned to the transitions by animators. Once the constants of the parametric equation have been optimized, the parametric equation can be applied to automatically determine (1006) a similarity value for the transition between the two concatenated motions.

In several embodiments, the parameters that are defined related to the position of a 3D character's feet, hips or other joints or limbs. In other embodiments, any of a variety of parameters can be utilized as appropriate to the requirements of a specific application.

In many embodiments, a parametric equation is designed to model the similarities between two frames with a set of constraints that operate on at least one of the relevant parameters. Different parameters may be used depending on the needs of the similarity value. For example, if an animator only focuses on the legs of an animated character while jumping, relevant parameters associated with the arms can be disregarded. In several embodiments, the learning process involves use of a Support Vector Machine where the animation parameters define the state vector. In many embodiments of the invention, determination of the parametric equation is performed using multivariate regression.

Recommendation of Additional Motions for Concatenation

Figure 8:
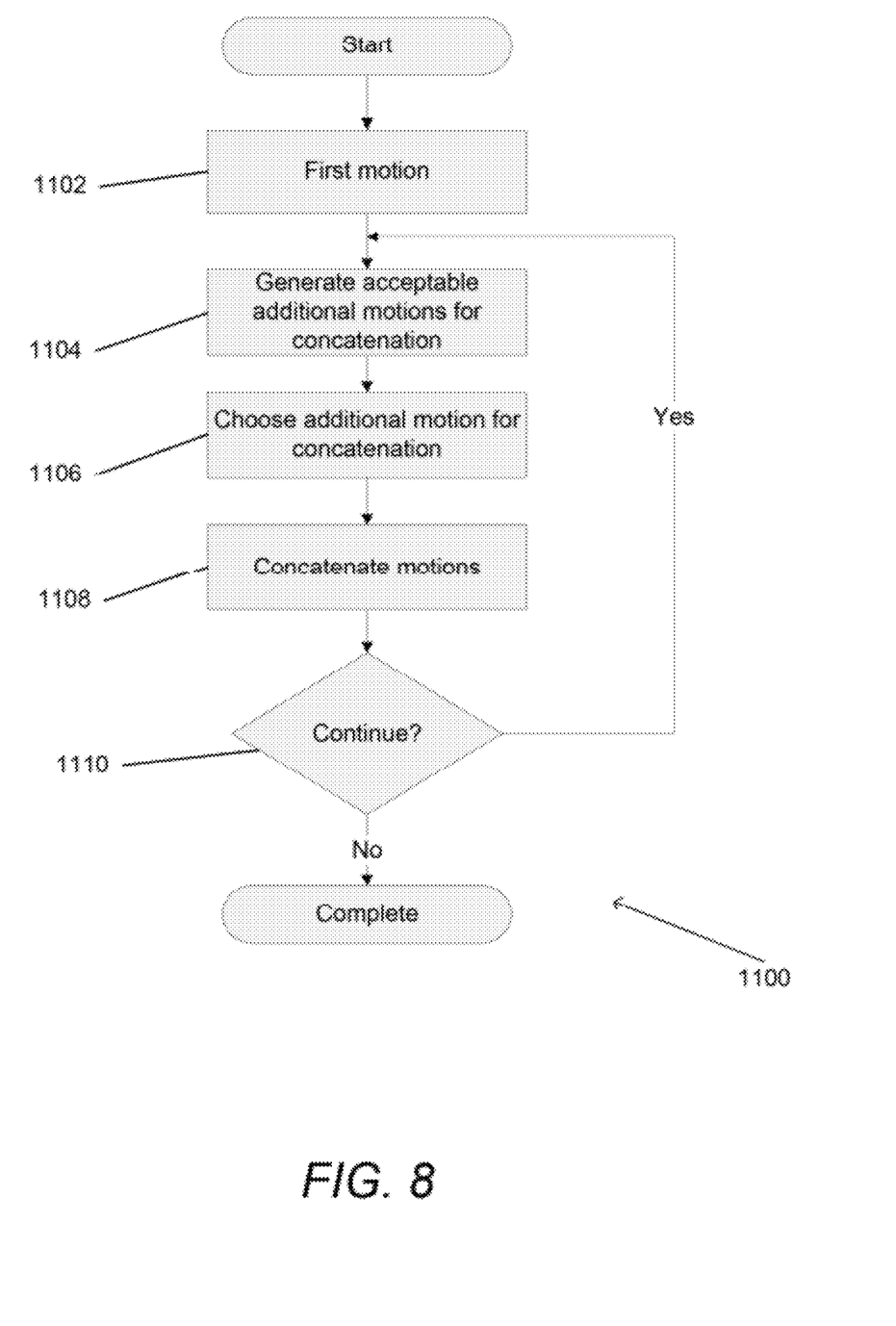
FIG. 8 is a flow chart illustrating a process for recommending acceptable additional motions for concatenation in accordance with an embodiment of the invention.

FIG. 8 is a flow chart illustrating a process 1100 for recommending motions for concatenation with a selected motion in accordance with an embodiment of the invention. The process 1100 includes selection (1102) of a first motion. Based upon the first motion selected, a set of motions for concatenation is generated (1104) based upon the similarity of the motions to the selected motion. After the animator has selected (1106) an additional motion, motion data is generated or obtained with respect to the motion and concatenated (1108) with the motion data of the initial motion sequence. A determination (1110) is then made concerning whether the animator wishes to add motions to the concatenated motion sequence. If the process is continued (1110), then a set of recommended motions for concatenation is generated (1104) based upon the previously selected motion. The process repeats until an animator has obtained a desired sequence of concatenated motions. The motion data can then be retargeted and used to animate a 3D character.

As discussed above a database containing metadata of possible motion combinations can be incorporated into an animation system in accordance with embodiments of the invention. When a user selects a motion by providing a high level description of the motion to the animation system, the animation system can query the database to identify motion models and/or high level descriptions that can be used to produce motion data that has a high similarity with the selected motion. The process can be continuous. For example, a user can select a running motion, then a walking motion, then a jumping motion, and then a crawling motion. Likewise, motions may also be added between already selected motions in a sequence of motions, such as later adding a skipping motion between the motions of running and walking. The choice of concatenation between motions is fluid and can be modified at any time. In various embodiments, a 3D character can be animated in real time using the concatentated motion data so that an animator can independently verify the smoothness of transitions.

User Interface

Figure 9:
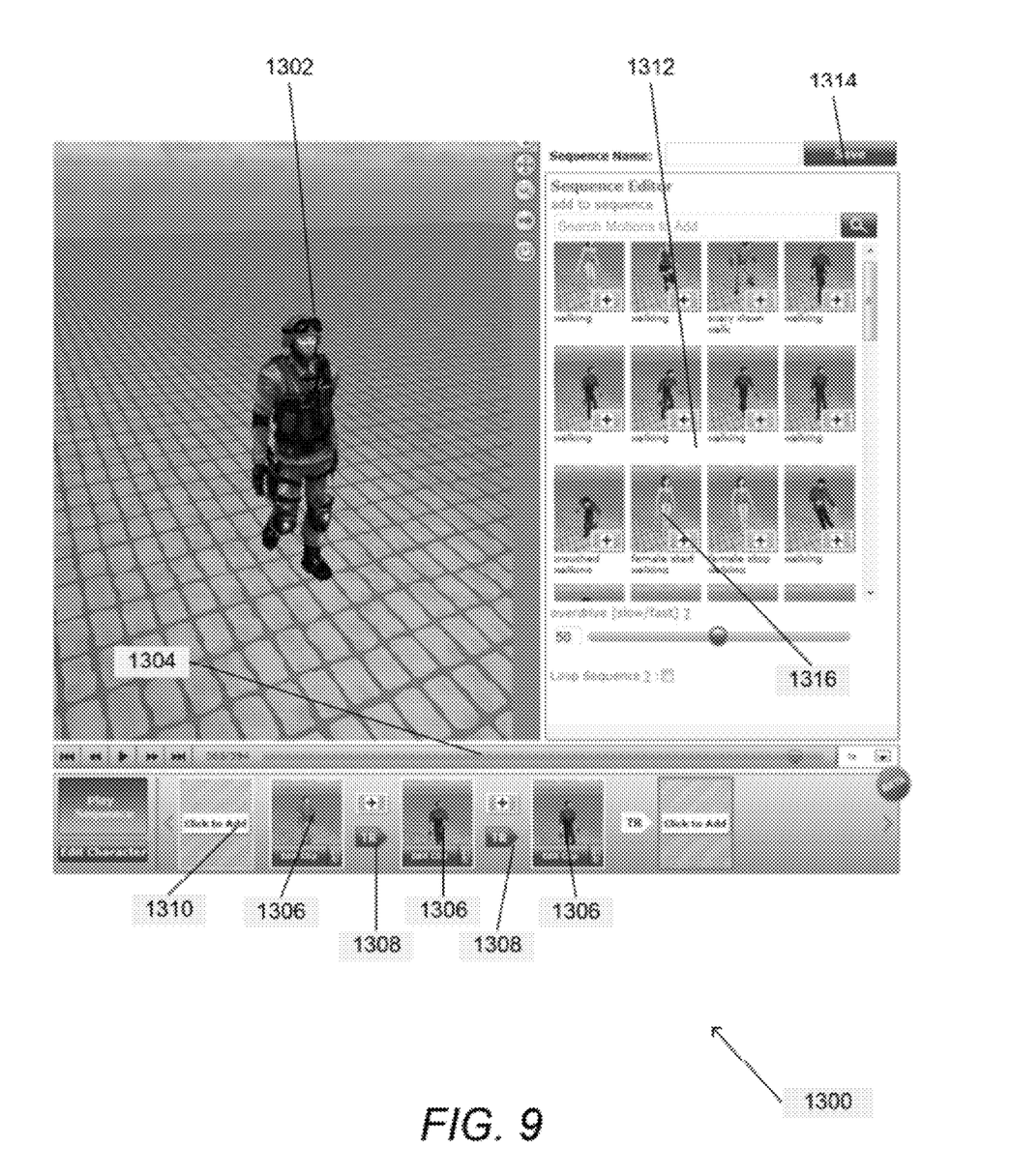
FIG. 9 is a conceptual illustration of a user interface for motion concatenation in accordance with an embodiment of the invention.

FIG. 9 is a conceptual illustration of a user interface 1300 for motion concatenation in accordance with an embodiment of the invention. The user interface 1300 includes a viewer 1302 that can be used to view the real time animation of a 3D character model, which can be controlled by a scrubber bar 1304 that allows the user to move anywhere in the animation sequence. Different animations 1306 are selected by the user and played in a sequence along with their respective transitions 1308. The user interface also presents recommendations 1312 concerning motions that can be concatenated with the existing sequence. In many embodiments, the user is able to specify the motion using a high level description of the motion. In a number of embodiments, the high level description of the motion can include (but is not limited to) a type of motion, a performance attribute, and/or a trajectory. A performance attribute describes the visual appearance of the motion and is similar to a description of the manner in which the motion is performed. For example, a performance attribute can include but is not limited to fatigue, happiness, stride length, and/or speed. In many embodiments, the trajectory is specified using a starting location and/or a finishing location. In a number of embodiments, trajectory can be expressed as a direction of motion and/or a time of motion. In several embodiments, a procedural attribute is also applied to one or motions. A procedural attribute can be an attribute common to all motions such as the curvature of the spine of the character and/or any other characteristic to be applied throughout a concatenated sequence of motion. Although specific high level descriptions of motions are discussed above, any of a variety of a high level descriptions appropriate to a specific application can be utilized in accordance with embodiments of the invention.

In the illustrated embodiment, a user is able to select a first animation 1302 and concatenate additional motions 1312 to that first animation to create a sequence of concatenated animations. In instances where the selected motions do not transition smoothly, a short "bridging" transition motion 1308 can be selected by the animator and/or recommended by the animation system to improve the smoothness of the transition. Although a specific user interface is illustrated in FIG. 9, any user interface appropriate to a specific application can be utilized in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation. Thus, embodiments of the present invention should be considered in all respects as illustrative and not restrictive.

What is claimed is:

1. A method for providing synthetic motion data from a server system to user device for use in animating a Three-Dimensional (3D) character comprising:
   obtaining motion data from a storage device using the server system, wherein the motion data includes labels the describe high level characteristics of a motion and describes changes of 3D animation variables of a character over time;
   training a motion model using the server system wherein the motion model is based on the obtained motion data using supervised learning wherein the motion model forms association between the high level characteristics and the motion stored in the storage device;
   receiving a high level description of a sequence of desired motions wherein the high level description includes high level characteristics of a plurality of sequential motions in the sequence from a user device in the server system via a user interface generated by a server system;
   generating synthetic motion data for each of the plurality of sequential motions using the server system based upon the high level characteristics of each of the plurality of sequential motions and the motion model;
   generating synthetic data for transitions between each pair of sequential motions in the sequence using the server system;
   concatenating the synthetic motion data for the plurality of sequential motions and the transitions using the server system;
   streaming the concatenated motion data from the server system to the user device; and
   rendering an animation of a 3D character based upon the streamed synthetic motion data using the user device.

2. The method of animating a 3D character of claim 1, further comprising:
   obtaining a custom model of a 3D character using the server system; and
   retargeting the concatenated motion data to the custom model prior to streaming the synthetic motion data to the user device.

3. The method of animating a 3D character of claim 2, wherein the custom model of a 3D character is uploaded to the server system from the user device.

4. The method of animating a 3D character of claim 2, wherein the custom model of a 3D character is generated by the server system in response to a high level description of the 3D character obtained from the user device via a user interface generated by the server system.

5. The method of claim 1, further comprising scoring the similarity between motion data of a pair of sequential motions in the sequence of motions using the server system.

6. The method of claim 5, further comprising refining the transition between the pair of sequential motions based upon a similarity score of the pair of sequential motions using the server system.

7. The method of claim 6, wherein refining the transition between the pair of sequential motions comprises inserting an intermediate motion data sequence between the concatenated motion data the pair of sequential motions using the server system.

8. The method of claim 1, wherein each high characteristic of a motion includes at least a motion type, and at least one performance attribute.

9. The method of claim 8, wherein the performance attribute is a description of a physical characteristic or an expressive characteristic of the motion.

10. The method of claim 8, wherein the motion type is expressed as one of a number of discrete types of motion.

11. The method of claim 8, wherein each high level characteristic of a motion includes the trajectory of the motion, which is specified by at least a start point and an end point.

12. The method of claim 8, wherein the performance attribute is expressed using at least one value from a continuous scale that corresponds to a high level characteristic that was used to describe differences between different ones of repeated motions in the motion data used to generate the motion model.

13. The method of claim 8, wherein each high level characteristic of a motion includes a procedural attribute that is applied to all concatenated motions.

14. The method of claim 1, wherein the synthetic motion data is based upon a standard model for a 3D character and further comprising:
    receiving a model of a 3D character in the server system from the user device via the communication network;
    retargeting the synthetic motion data to the received model of a 3D character using the server system; and
    streaming the retargeted synthetic motion data from the server system to the user device.

15. The method of claim 1, wherein receiving the high level description of the sequence of desired motion from a user device via a user interface generated by a server system further comprises:
    receiving the high level description via the user interface;
    querying a database including similarity scores for specific combinations of sequential motions based upon the high level descriptions of motion characteristics to obtain at least one similar motion;
    generating a user interface listing the at least one similar motion; and
    receiving a second high level description of motion characteristics selected based upon the list of at least one similar motion.

16. A server system that is connected to a communication network and provides animation for a three-dimensional (3D) character to a user device for use in animating the 3D character using the user device, comprising:
    at least one processor;
    a memory readable by the at least one processor; and
    instructions stored by the memory that when read by the at least one processor direct the at least one processor to:
        communicate with a database storing motion data including repeated sequences of a plurality of different motions, wherein the differences between the repeated sequences of the different motions are described using at least one high level characteristic and the motion data describes changes of the animation of a 3D character over time,
        train a motion model using the motion data wherein the motion model forms associations between the at least one high level characteristic and the motion data stored in the database,
        generate a user interface that is accessible by a user device via the communication network,
        receive a high level description of a sequence of desired motions from the user device via the communication network using the user interface, wherein the high level description includes high level characteristics for the each desired motion in the sequence of desired motion,
        generate synthetic motion data for each desired motion in the sequence of desired motions using the motion model based on the high level description of the sequence of desired motions and the association between the high level characteristics and the stored motion data formed by the motion model,
        generate synthetic motion data for transitions between sequential desired motions in the sequence of desired motions,
        concatenate the synthetic motion data of the desired motions in the sequence with the generated synthetic motion data for the transitions between sequential desired motions in the sequence, and
        provide the concatenated synthetic motion data to the user device wherein the concatenated synthetic motions is used by a rendering engine in the user device to animate the 3D character.

17. The server system of claim 16 wherein the instructions further direct the at least one processor to generate the synthetic motion data for the transitions by determining optimal parameters for each transition between sequential desired motions in the sequence using a similarity map.

18. The server system of claim 16 wherein the instructions further direct the at least one processor to determine a similarity score for each transition.

19. The server system of claim 18 wherein the instructions further direct the at least one processor to refine a transition based upon the similarity score of the transition.

20. The server system of claim 19 wherein the instructions further direct the at least one processor to refine a transition by inserting an intermediate motion data sequence between the synthetic motion data for two sequential motions.

21. The server system of claim 16 wherein the high level description of the sequence of desired motions includes a motion type and a performance attribute for each of the desired motions.

22. The server system of claim 21 wherein a performance attribute is one of physical characteristic or an expressive characteristic of a motion type associated with the performance attribute.

23. The server system of claim 21 wherein the motion type is expressed as one of a number of discrete types of motion.

24. The server system of claim 21 wherein the high level description of the sequence of desired motions further comprises a trajectory of the motion including a start point and an end point.

25. The server system of claim 21 wherein the performance attribute is expressed using at least one value from a continuous scale that corresponds to a high level characteristic that was used to describe differences between the repeated sequences of each of the plurality of different motions used to generate the motion models.

26. The server system of claim 21 wherein the high level description of the sequence of desired motions further describes a procedural attribute that is applied to each motion in the sequence of desired motions.

27. The server system of claim 16 wherein the synthetic motion data is based upon a standard 3D character and the instructions further direct the processing system to:

receive a model of a 3D character from the user device via the communication network using the user interface; and retarget the concatenated synthetic motion data from the standard 3D model to the 3D character model received from the user device to form the concatenated synthetic motion data provided to the user device.

28. The server system of claim 16 wherein the instructions further direct the processor to:

query a database that stores similarity scores for specific combinations of motions for motions similar to a sequential combination of motions from the sequence of desired motions; and generate a user interface listing the motions similar to the sequential combination of motions in the user interface provided to the user device.

29. The server system of claim 28 wherein the instructions further direct the processor to receive a second high level description of the sequence of desired motions based upon the listing of similar motions.

* * * * *